United States Patent [19]

Smith

[11] 4,194,973

[45] Mar. 25, 1980

[54] METHOD OF LOWERING THE COLOR OF EFFLUENT WHICH CONTAINS ARYL AZO- OR ARYL NITRO-CONTAINING COMPOUNDS

[75] Inventor: Roy E. Smith, Mill Hall, Pa.

[73] Assignee: American Color & Chemical Corporation, Charlotte, N.C.

[21] Appl. No.: 937,164

[22] Filed: Aug. 28, 1978

Related U.S. Application Data

[63] Continuation of Ser. No. 782,440, Mar. 29, 1977, abandoned.

[51] Int. Cl.² ............................ C02B 1/20; C02C 5/02
[52] U.S. Cl. ........................................ 210/50; 210/51; 210/56
[58] Field of Search .................... 8/74, 81; 210/42 R, 210/47, 49, 50-53, 56

[56] References Cited

U.S. PATENT DOCUMENTS

| | | | |
|---|---|---|---|
| 3,461,067 | 8/1969 | Matsumoto et al. | 210/47 |
| 3,575,853 | 4/1971 | Gaughan et al. | 210/50 |
| 3,752,759 | 8/1973 | Burg et al. | 210/50 |
| 4,005,011 | 1/1977 | Sweeny | 210/18 |
| 4,045,171 | 8/1977 | Lancy | 210/42 R |

FOREIGN PATENT DOCUMENTS

| | | | |
|---|---|---|---|
| 2323600 | 11/1974 | Fed. Rep. of Germany | 210/50 |
| 4627992 | 9/1966 | Japan | 210/50 |
| 49-72225 | 6/1974 | Japan | 210/47 |
| 51-853 | 7/1976 | Japan . | |
| 2560 | of 1893 | United Kingdom | 210/56 |
| 345102 | 1/1971 | U.S.S.R. | 210/50 |

OTHER PUBLICATIONS

Porges et al. "Chemical Precipitation of Textile Wastes and Studies of pH Control," *Sewage Works Journal,* 9/1939, pp. 828-863.

*Primary Examiner*—Charles N. Hart
*Assistant Examiner*—Peter A. Hruskoci
*Attorney, Agent, or Firm*—Armstrong, Nikaido, Marmelstein & Kubovcik

[57] ABSTRACT

Effluent which contains aryl azo- and/or aryl nitro-containing compounds is treated to remove the color by contacting the effluent with Fe(II) in the presence of iron at a temperature and for a time sufficient to cause reduction of the aryl azo and aryl nitro groups of the effluent. Effluent containing metallized compounds may be treated in the same manner and then subjected to alkaline neutralization to remove the metal from the effluent.

8 Claims, No Drawings

METHOD OF LOWERING THE COLOR OF EFFLUENT WHICH CONTAINS ARYL AZO- OR ARYL NITRO-CONTAINING COMPOUNDS

This is a continuation, of application Ser. No. 782,440 filed Mar. 29, 1977 abandoned.

BACKGROUND OF THE INVENTION

1. Field of the Invention

This invention relates to the treatment of effluent, which contains chromophoric compounds and, particularly, aryl azo- and aryl nitro-containing compounds and, optionally, metallized compounds, to reduce the color and the heavy metal content thereof.

2. Description of the Prior Art

Recent concern over the color value of effluents discharged into rivers and streams and enforcement of governmental regulations relating thereto have emphasized the need for effective, yet relatively inexpensive, means for decolorizing such effluent without, in turn, creating other ecological disturbances. One area in which such need exists is in those industries which discharge waste liquor containing ecologically significant amounts of chromophoric compounds such as aryl azo- or aryl nitro-containing compounds. Such effluent is highly colored and may not conform to governmental standards restricting the color value of industrial discharge. Effluent which contains aryl nitro-containing compounds is also objectionable in that these compounds are bactericides and are inimical to anaerobic sewage treatment systems.

In the manufacture of water-soluble dyes, there is always a substantial amount of dye left in solution following "salting" techniques employed for isolating the dyes by filtration. Additionally, there are also many undesired materials such as unreacted starting materials, by-products and decomposition products which are not isolated with the reaction products. Many of these materials are highly colored and also contribute to the color of the effluent.

Usual methods for decolorizing this effluent include oxidation by chlorine, hypochlorites, ozone and the like. These methods are not preferred from an industrial standpoint, however, because they tend to be too costly either because the decolorization is too slow and requires large holding tanks and/or times or because the reactants, themselves, are expensive. Anaerobic systems will destroy a certain amount of color caused by azo dye chromophores but the economics are not attractive.

In Japanese Laid-Open Publication No. 76853/1973 published July 3, 1976, a method is disclosed for decolorizing waste liquor containing azo, phthalocyanine, xanthene and azine dyes. According to the process the liquor is decolorized by adding both (A) a sulfite and/or a bisulfite and (B) a catalytic amount of iron powder and/or ferrosilicon powder to the colored waste liquor. The publication teaches that both (A) and (B) must be present to achieve decolorization. In Reference Example 2 of the publication it is shown that decolorization of a liquor containing a disazo dye (C.I. Direct Blue I) and having an APHA of about 500,000 does not occur with the use of iron powder alone.

The use of sulfite or bisulfite, however, as disclosed in the Japanese Laid-Open Publication is not desired from an industrial standpoint because the sulfite or bisulfite, which is eventually discharged to a sewer, is an extra manufacturing expense and because obnoxious sulfur dioxide is discharged during the treatment.

It is an object of the present invention, therefore, to provide a method for decolorizing effluent containing environmentally significant amounts of color, particularly in the form of aryl azo- and aryl nitro-containing compounds.

It is also an object of the present invention to provide a method for decolorizing effluent containing aryl azo- and aryl nitro-containing compounds which is economically attractive and which avoids the problem of the usual methods employed for decolorization of effluent containing these compounds.

It is a further object of the invention to provide a method for lowering the metal content and the color of effluent containing metallized compounds.

These and other objects of the present invention will become apparent from the following summary and description of preferred embodiments.

SUMMARY OF THE INVENTION

According to the present invention, a method is provided for decolorizing, or lowering, the color of effluent containing aryl azo- or aryl nitro-containing compounds by contacting the effluent with Fe(II) in the presence of iron at a pH of from about 3 to about 9 at a temperature and for a time sufficient to cause a desired reduction of the aryl azo and aryl nitro groups of said compounds thereby reducing the color.

In another embodiment, effluent containing metallized compounds such as metallized azo dyes and by-products of the production thereof, alone or in combination with the aryl azo- or aryl nitro-containing compounds, following treatment with the Fe(II), which chemically alters the structure of the metallized compounds and reduces the metal, is subjected to alkaline neutralization to cause the metal of the metallized dyes to precipitate out of the effluent.

DESCRIPTION OF PREFERRED EMBODIMENTS

The term, decolorization, as employed herein is not intended to mean a complete removal of color but, instead, is intended to mean a desired lowering in the color of an effluent. Generally, of course, a significant reduction in color to levels that permit the discharge of effluent of ecologically acceptable color will be desired and this can be accomplished according to the method of the invention. Thus, for example, the color of effluent produced in the production of water-soluble dyes may range anywhere from several thousand up to 1,000,000 APHA (APHA refers to the American Public Health Association's Platinum-Cobalt Scale for designating the colors of waters and is described in "Standard Methods for the Examination of Water and Sewage," 8th Ed. American Public Health Association, NYC, 1936, p. 12) or more. Governmental limits, on the other hand, for discharge to a river are sometimes as low as 100 APHA. Although reduction of the APHA of effluent to this lower limit may not be required industrially because of possible dilution with other colorless effluent, a significant reduction is still required.

Although the method according to the present invention can effectively be applied to the treatment of effluent containing any chromophore that is reducible by Fe(II), a preferred application, from a standpoint of ecological necessity, is in the decolorization of effluent wherein the color is caused primarily by aryl azo- and aryl nitro-containing compounds in solution in the effluent. The method is particularly useful in the treatment of effluent wherein the aryl azo- and aryl nitro-containing compounds result from the manufacture of water-soluble dyes.

The aryl azo-containing compounds referred to herein are those wherein at least one of the nitrogen atoms of the azo group is attached to an aromatic ring derived from benzene or naphthylene and include mono-, dis-, tris- and tetrakisazo compounds and azoic compounds. The aryl nitro-containing compounds are those wherein the nitrogen is attached to an aromatic ring derived from benzene, naphthylene and anthracene. The terminology aryl azo- and aryl nitro-containing compounds is intended to include all compounds which would generally be considered by one skilled in the dye art to be aryl, or aromatic, azo or nitro dyes.

The effluent can also be that resulting from the use of water-soluble azo and nitro dyes such as, for example, in the dyeing of paper.

The method according to the present invention is also believed to be useful in the treatment of effluent containing xanthene and azine dyes.

As mentioned above, the method according to the present invention is also employed to treat effluent containing metallized compounds. Such metallized compounds include, for example, azo compounds metallized with copper, cobalt, or chromium, and soluble inorganic salts. In addition to lowering the color of the effluent, the method produces an insoluble form of the metal which can be removed by alkaline neutralization of the effluent and filtering thereof. It appears that the Fe(II) destroys the chromophore of the metallized compound and reduces the metal associated therewith thereby lowering the color of the effluent and enabling the metal to be removed as the insoluble metal or an insoluble compound of the metal following alkaline neutralization of the effluent.

The effluent may contain and will typically contain mixtures of the above mentioned chromophoric compounds.

There are not believed to be any material limitations regarding the amounts of aryl- and aryl nitro-containing compounds and metallized compounds that can be contained in effluent decolorized according to the present invention. The effluent, however, will generally contain levels of aryl azo-containing, aryl nitro-containing and-/or metallized compounds which are environmentally significant. Thus the method can be applied to the decolorization of effluent discharged from commercial processes for producing water-soluble azo, nitro and metallized dyes. It is generally not possible to specify the amounts of these compounds contained in such effluent because, firstly, such effluent contains not only the water-soluble dyes not removed by "salting" techniques, but also incompletely formed dyes, by-products and unreacted starting materials. Secondly, the nature of the effluent will vary considerably depending upon inventory levels and customer demands for specific products. Such effluent is typically characterized according to the APHA units thereof, amounts of suspended and dissolved solids, amounts of metals and the like. One such method for characterizing dye effluent is illustrated in U.S. Pat. No. 4,005,011 wherein characteristics of raw waste resulting from the manufacture of a synthetic dyestuff are described. As stated above, effluent to which the method according to the present invention can be applied will typically have APHAs ranging from several thousand up to 1,000,000 and above. There is no definable lower range of APHA for effluent to which the method can be applied. It is to be understood, however, that a certain amount of the color of the effluent produced in the manufacture of water-soluble dyes may not be removable by the process according to the present invention because some of the color of the effluent may be due to dirt, rust or the like present in the effluent.

According to the present invention, the color of the effluent is lowered by contacting the effluent with FE(II) which acts as a reducing substance. Fe(II) designates $Fe^{++}$ ion, sometimes referred to as soluble iron. The Fe(II) may be generated in the effluent by solubilizing iron present therein or by the addition of ferrous salts to the effluent. Thus, for example, the pH of the effluent may be adjusted to an acid pH, prior or subsequent to bringing the effluent into contact with the iron, by the addition of a suitable acid to the effluent. The acid can be any mineral or organic acid including, for example, sulfuric acid, acetic, nitric and hydrochloric acid. The iron is "etched" at the acid pH to remove grease or the like to expose the iron and facilitate formation of the Fe(II). The amount of the acid required will vary depending on the initial pH, buffering capacity of the effluent and the like and can be readily determined. Amounts of several percent or less by weight based on the amount of effluent are typical.

The Fe(II) may also be generated in the effluent by the addition of ferrous salts thereto. The Fe(II), however, is used up in the reduction reaction and it is desirable to conduct the treatment in the presence of iron as a source of the Fe(II).

The amount of Fe(II) required in the effluent at any given time is that amount required to form a reducing solution. It is possible that this amount of Fe(II) may not be detactable by conventional means. Additionally, there must be enough Fe(II) generated in the system to reduce the color of the effluent to a predetermined ecologically acceptable level.

The required amount of Fe(II) is generated in the effluent treated according to the method of the present invention by employing the iron in amounts in excess of that theoretically required to chemically reduce the azo or nitro chromophores or the metallized compounds in the effluent. A large excess of the iron can be used since the iron is not otherwise deleterious to the method and the excess is not discharged with the treated effluent but is recovered for reuse. On the other hand, the amount of iron employed should not be so great as to hinder its removal from the treated effluent. Theoretically, 6 moles or iron are required for the reduction of 1 mole of nitro groups to amines and 4 moles are required for the reduction of 1 mole of azo groups to amines. In practice, however, the amount of iron actually consumed is less than the theoretical amount because it is not necessary to reduce completely to the primary amine to reach an acceptable color. For example, it is likely that some azo groups in effluent treated according to the present method are reduced only to the hydrazo form. The actual amount of iron required will vary depending on amounts of colored components in the effluent as will be understood by one skilled in the art and will typically be less than several percent by weight based on the weight of the effluent treated.

The iron may be in the form of metallic iron or alloys as long as the Fe(II) required for the reducing solution can be generated therefrom under the conditions of the treatment. Although, in theory, the iron can have any physical form, best results are obtained employing a finely divided iron because of the greater available surface area. Finely divided iron of about 80 mesh has been found to be particularly useful because it gives efficient rates and its handling characteristics are suitable. Finely divided iron of 20 mesh and iron turnings have also been used although efficiency is somewhat decreased. The choice of the form of the metal is determined primarily by the convenience in its use and the rate at which the Fe(II) is generated.

The pH of the effluent is maintained during the treatment to be within the range of from about 3 to about 9. Preferably, the method is carried out at a pH within the range of from about 5 to about 7.5 and most preferably at a pH of within the range of from about 5 to about 6.5. At a pH less than about 3 the iron will be used up at an excessive rate whereas above a pH of about 9, oxides and hydroxides of the iron may precipitate at a faster rate than is practical. At a pH above about 7.5 the rate of generation of Fe(II) becomes impractical although decolorization itself can be carried out if the amount of Fe(II) already in solution is sufficient to reduce the aryl azo- and aryl nitro-containing compounds and metallized compounds in the effluent to the desired level. At a pH within the range of about 5 to about 6.5 the iron continues to dissolve at an acceptable rate but is not used at an excessive rate.

The decolorization of effluent containing aryl azo- or aryl nitro-containing compounds of metallized compounds is sensitive to the temperature of the effluent. At a temperature within the range of about 25° C. the rate of decolorization is so slow as not to be practical or operably attractive. A practical and preferred lower range of temperature is 40–50° C. The rate of decolorization increases significantly with temperature from about 50° C. to about 80° C. Most efficient decolorization is obtained at about 60°–75° C. The most efficient temperature, however, will not always be the most economical. Thus, a temperature of within the range of about 40° C. to 70° C. will be sufficient in the treatment of effluent discharged in the processes for manufacturing most water-soluble dyes and in the dyeing of paper since the effluent is typically discharged at these temperatures. As noted above, higher temperatures can be employed for efficient temperature utilization but are not generally used for reasons of economy and energy conservation. Thus, for example, the APHA of effluent containing aryl azo- and aryl nitro-containing compounds is easily reduced from 500,000 to about 10,000 at 50 to 60° C. and at a pH of from about 5 to 6.5 (decolorization is rapid, within the order of several minutes). The effluent is almost colorless within ½ to about 1 hour. The effect of raising the temperature of the effluent above 80° C. is generally not sufficient to warrant the increased energy requirements and may adversely affect the filterability of the effluent.

The time during which the effluent is contacted with Fe(II) in the presence of iron will depend upon the initial APHA of the effluent and the desired degree of decolorization. For the temperatures and pH specified above, decolorization to predetermined ecologically acceptable levels will typically be complete within from several minutes to several hours. Aryl nitro-containing compounds will also be reduced to biodegradable forms within this time.

The decolorization may be carried out batchwise or continuously. If the decolorization is carried out batchwise, the effluent is preferably agitated at a rate such that intimate contact between Fe(II) and the aryl azo- or aryl nitro-containing compounds or metallized compounds is ensured and to ensure a sufficient rate of generation of the Fe(II). The method according to the invention may be carried out in a continuous fashion by passing effluent having a previously adjusted pH over a column of iron. The rate at which the effluent is passed through the column will depend, of course, on the concentration of the colored components, the pH and temperature of the effluent, the desired degree of decolorization and the available surface area of the iron.

In the treatment of effluent according to the present invention, the Fe(II) is converted to Fe(III) which can be precipitated from the effluent by alkaline neutralization if removal thereof is required. Additionally, as stated above, during the treatment of effluent containing metallized compounds such as, for example, metallized azo dyes, the insoluble metal or a form which will become insoluble upon raising the pH is formed which can also be removed from the treated effluent by alkaline neutralization. The alkaline neutralization may be carried out by any conventional means such as, for example, by the addition of a suitable hydroxide such as sodium hydroxide, potassium hydroxide or lithium hydroxide to the decolorized effluent. It has been found to be economically practical to employ powdered calcined limestone (CaO, Ca(OH)$_2$) for the alkaline neutralization. The amounts of the neutralization agent employed is that amount required to raise the pH of the treated effluent to about 9 to 12 at which pH range precipitation of formed insoluble substances occurs. Amounts of several percent by weight based on the weight of treated effluent (not including the weight of the iron) are generally sufficient. The Fe(III) in the treated effluent precipitates out as ferric hydroxide and can be removed by established procedures. Copper, cobalt and chromium of metallized compounds contained in the effluent will generally precipitate out either as the elemental metal or as oxides or hydroxides thereof.

The invention may be better understood, however, by referring to the following examples.

EXAMPLE I

An effluent containing a metallized water-soluble azo dye prepared by coupling 1-phenyl-3-methyl-5-pyrazolone with diazotized 2-amino-1-phenol-4-sulfonamide and metallizing with chromium was decolorized according to the method of the present invention. The effluent had an initial APHA of 350,000; a pH of 5.5–6.0; a temperature of 55°–60° C. and a Cr content of 600 ppm. Finely divided iron of about 80 mesh was employed in an amount of about 2% by weight based on the weight of the solution. The APHA was reduced to 80,000 and the Cr content to 20 ppm by maintaining the solution in contact with the iron for one hour and 45 minutes followed by alkaline neutralization and filtering to remove the metals.

EXAMPLE II

An effluent containing a water-soluble metallized dye prepared by diazotizing anthranilic acid and coupling into 1-(p-sulfophenyl)-3-methyl-5-pyrazolone and metallizing with chromium was treated under conditions identical to those of Example I. The following results were obtained:
APHA: 1,000,000 (initial) to 50,000
Cr: 500 ppm to 15 ppm Time: 45 minutes.

EXAMPLE III

An effluent obtained in the preparation of C.I. Direct Black 190 ( a trisazo dye prepared by diazotizing dianisdine and coupling one end into R salt and the other end into H acid; diazotizing the resultant dye and coupling into 1-phenyl-3-methyl-5-pyrazolone and thereafter copperizing the resultant dye) was treated in a manner identical to that of Example I. The following results were obtained:
APHA: $10^5$–$10^6$ (initial) to 4,000
Cu: 3,200 ppm to 0.4 ppm
Time: 1 hour

EXAMPLE IV

An effluent obtained in the preparation of C.I. Direct Red 80 (a tetrakisazo dye formed by diazotizing two moles of aminoazobenzenedisulfonic acid and coupling into J acid urea) was treated in a manner identical to that of Example I. The following results were obtained:
APHA: $10^6$ (initial) to 6,000
Time: 2 hours and 42 minutes

EXAMPLE V

A solution obtained in the preparation of a dye formed by diazotizing 2,5-dichlorosulfanilic acid and coupling into N-ethyl-N-benzylaniline having an initial APHA of 500,000 and a pH of 5.0–6.5 was treated according to the method of the present invention. The solution was contacted with about 2% by weight based on the weight of the effluent of iron turnings at about 40° to 50° C. After about ½–¾ hour the APHA was reduced to about 10,000. During this period the pH increased to 8.5.

EXAMPLE VI

An effluent obtained in a typical day's production of a plant manufacturing water-soluble azo dyes and containing both metallized and unmetallized direct azo and acid azo dyes was treated according to the method of the present invention. The effluent had an APHA of about 70,000; a temperature of about 60° C. to 70° C. and a pH of about 9. The pH was adjusted to 5.0 and the effluent was treated under similar conditions to those of Example V for one hour. The APHA was reduced to 5,000.

Although the invention has been described in conjunction with certain preferred embodiments thereof, it is not to be limited thereto but instead includes all those embodiments within the spirit and scope of the appended claims.

What is claimed is:

1. A method of treating effluent, which contains chromophoric aryl azo- and/or aryl nitro-containing compounds, to lower the color of the effluent to predetermined ecologically acceptable levels, said method consisting essentially of the step of contacting said effluent with an effective amount of a reducing substance consisting of Fe(II) in the presence of metallic iron at a pH in the range of from about 3 to about 7.5 and at a temperature of from about 40° C. to about 80° C. for a time sufficient to chemically reduce and destroy the chromophore of said aryl azo- and aryl nitro-containing compounds and lower the color of the effluent to the predetermined ecologically acceptable levels.

2. The method of claim 1 wherein the temperature is in the range of 60° C. to 75° C.

3. The method of claim 2 wherein the pH is in the range of from about 5.0 to about 6.5.

4. The method of claim 3 wherein the iron is finely divided iron having an average particle size of from about 20 to 80 mesh.

5. A method of treating effluent, which contains chromophoric metallized aryl azo-containing compounds, to lower the color and metal content thereof to predetermined ecologically acceptable levels, the method consisting essentially of the steps of contacting said effluent with an effective amount of a reducing substance consisting of Fe(II) in the presence of metallic iron at a pH of from about 3 to about 7.5 and at a temperature of from about 40° C. to about 80° C. for a time sufficient to chemically reduce and destroy the chromophore of said metallized compounds and lower the color of the effluent; thereafter adjusting said effluent to a pH of about 9 to about 12 to cause precipitation of insoluble forms of the metal of the metallized compounds and of the iron and separating the precipitates from the treated effluent.

6. The method of claim 5 wherein the temperature is in the range of 60° C. to 75° C.

7. The method of claim 6 wherein the pH is in the range of from about 5.0 to about 6.5.

8. The method of claim 7 wherein the iron is finely divided iron having an average particle size of from about 20 to 80 mesh.

* * * * *